United States Patent

[11] 3,603,882

[72] Inventor Bernard Wilson
Coventry, England

[21] Appl. No. 816,533
[22] Filed Apr. 16, 1969
[45] Patented Sept. 7, 1971
[73] Assignee General Electric and English Electric Companies Limited
London, England
[32] Priority Apr. 17, 1968
[33] Great Britain
[31] 18129/68

[54] PHASE SHIFT DATA TRANSMISSION SYSTEMS HAVING AUXILIARY CHANNELS
4 Claims, 4 Drawing Figs.

[52] U.S. Cl. 325/47, 179/15 BM, 179/15 BC, 325/13, 325/34, 325/139, 325/327, 329/112, 332/22
[51] Int. Cl. H04b 1/00
[50] Field of Search 325/11, 30, 40, 61, 139, 321, 322, 323, 324, 325, 38, 38.1, 38 A, 34, 47, 60, 327, 141; 178/67; 332/9, 22, 10; 179/15 MM, 15 OR; 329/50, 103, 110, 112, 122, 124, 126

[56] References Cited

UNITED STATES PATENTS

| | | | |
|---|---|---|---|
| 2,784,255 | 3/1957 | Earp | 332/9 |
| 2,784,257 | 3/1957 | Earp | 325/321 |
| 2,774,817 | 12/1956 | Earp | 325/322 |
| 2,852,606 | 9/1958 | Curry | 332/22 |
| 3,004,155 | 10/1961 | Brite | 325/139 |
| 3,223,779 | 12/1965 | McFarlane | 325/30 |
| 3,384,822 | 5/1968 | Miyagi | 325/61 |

*Primary Examiner*—Robert L. Griffin
*Assistant Examiner*—Albert J. Mayer
*Attorney*—Kirschstein, Kirschstein, Ottinger & Frank

ABSTRACT: In a data transmission system utilizing phase shift modulation of a carrier signal to transmit pulse coded data from one station to another an auxiliary low frequency signal is transmitted between said stations by frequency modulation of the carrier signal, the maximum phase shift of the carrier signal due to said frequency modulation during any one pulse interval of the data signals being much less than the minimum step phase shift utilized in transmitting said data.

INVENTOR
BERNARD WILSON

BY Kirschstein, Kirschstein, Ottinger & Frank
ATTORNEYS

INVENTOR
BERNARD WILSON
BY Kirschstein, Kirschstein, Ottinger & Frank
ATTORNEYS

INVENTOR
BERNARD WILSON
BY
Kirschstein, Kirschstein, Ottinger & Frank
ATTORNEYS

PHASE SHIFT DATA TRANSMISSION SYSTEMS HAVING AUXILIARY CHANNELS

The present invention relates to data transmission systems, and in particular to such systems utilizing phase modulation to transmit pulse coded data from one station to another.

It is an object of the present invention to provide an auxiliary communication channel in such a data transmission system. One or more such auxiliary channels may be used for supervisory and control purposes between stations of the system, and it is desirable for such channels to be distinct from the data transmission channels and for the auxiliary signals directed to, say, an intermediate station or a repeater station to be recoverable without full demodulation of the main signals.

According to one aspect of the present invention in a data transmission system utilizing phase modulation of a carrier signal to transmit pulse coded data from one station to another, an auxiliary communication channel between said stations is provided by frequency modulating on to said carrier an auxiliary signal the highest frequency component of which is of lower frequency than the data bit rate, such that the maximum phase shift of the carrier signal due to said frequency modulation during any one pulse interval of said data transmission system is much less than the minimum step phase shift utilized in transmitting said data.

According to another aspect of the present invention in a data transmission system utilizing phase modulation of two or more carrier signals of different frequency to transmit pulse coded data from one station to another, one or more auxiliary communication channels between said stations are provided by frequency modulating on to one or more of said carrier signals an auxiliary signal the highest frequency component of which is of lower frequency than the data bit rate, such that the maximum phase shift of the carrier signal due to said frequency modulation during any one pulse interval of said data transmission is much less than the minimum step phase shift utilized in transmitting said data.

A data transmission system in accordance with the present invention will now be described with reference to the accompanying drawings, of which:

Figures 1, 2:
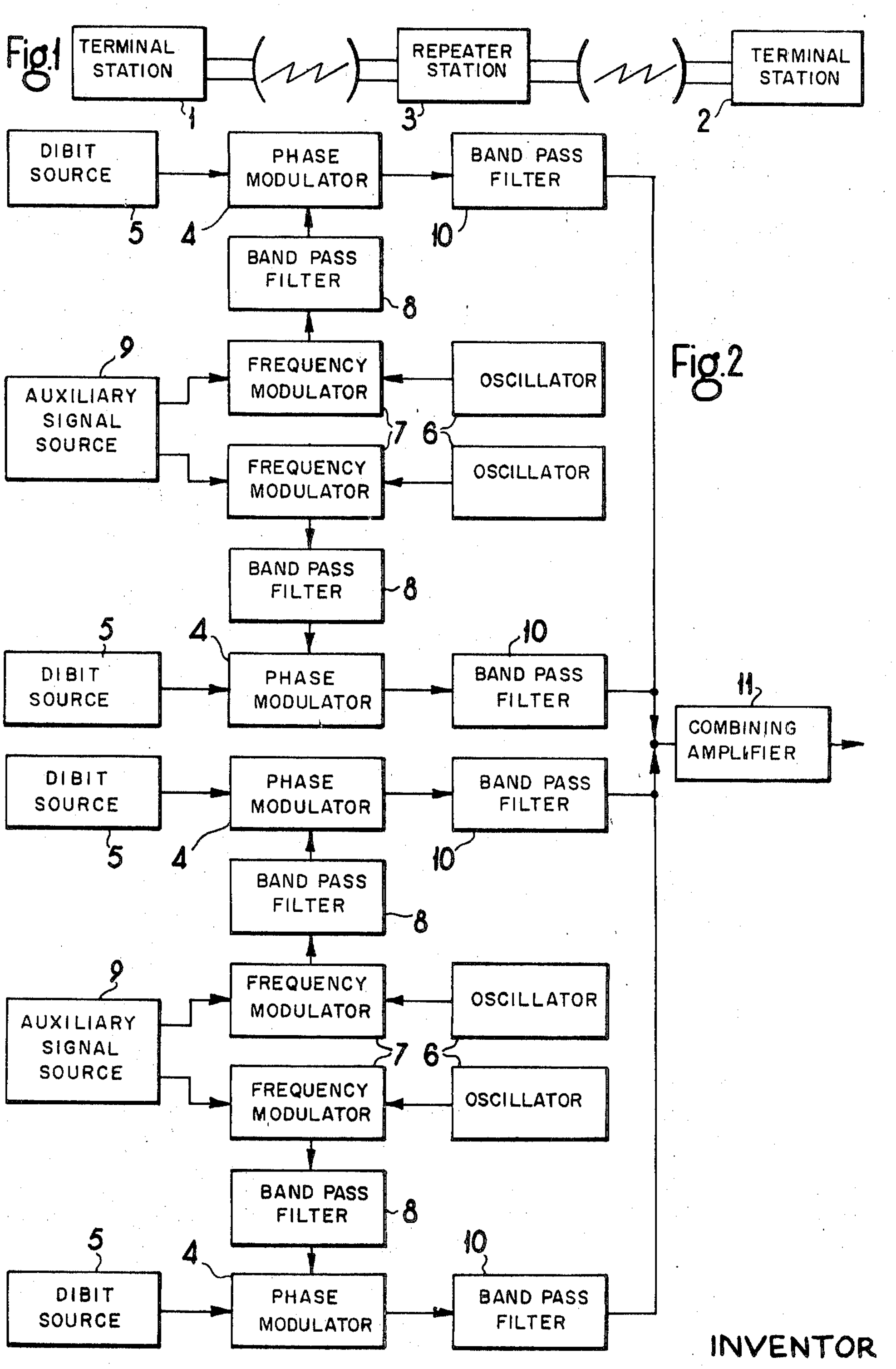
FIG. 1 shows the transmission system schematically.
FIG. 2 shows schematically transmitting station apparatus for the system of FIG. 1.

Referring first to FIG. 1, the system comprises two terminal stations 1 and 2 between which data is transmitted in pulse coded form by differential phase shift modulation of four carrier signals in each direction. The carrier signals are of different frequencies in the region of, say, 9,000 megaHertz, and the basic pulse signalling interval may be, say, twenty nanoseconds. At the commencement of each pulse interval the phase of a carrier signal is shifted by a multiple of 90° with respect the the phase of said carrier during the previous pulse interval, the multiple representing which of four possible values is to be signalled by that particular phase shift. The four values may for example be digit values, that is the values of pairs of binary digits, these pairs of digits being either successive digits in a single stream of digits of one from each of two independent streams of digits that are combined for transmission.

The carrier signals may be relayed by radio links between the terminal stations 1 and 2 by way of one or more repeater stations 3. At each repeater station 3 the received signal may be changed down in frequency (without demodulation down to the modulating signal per se), amplified and then changed up again to a different carrier frequency for retransmission. Alternatively, carrier signals may be amplified without change of frequency and retransmitted via an antenna system with adequate discrimination between transmitted and received signals.

Referring now to FIG. 2, auxiliary or supervisory channels between the terminal stations 1 and 2 may be provided by frequency (or phase) modulating the four carrier signals with auxiliary signals having frequency components up to, say 2 megaHertz and utilizing a maximum frequency deviation of, say, 2 megaHertz. For frequency modulation with these frequencies it can be shown that the maximum phase deviation of the carrier signal due to the frequency modulation over a 20 nanosecond pulse interval will be of the order of 3.6°, and this maximum deviation is well below the level at which any difficulty would be experienced in demodulating the pulse coded data signals.

The data signals that are modulated onto the four carrier signals are applied in the required dibit form to phase modulator circuits 4 from dibit sources 5. Local oscillation signals at the required carrier frequency, or more usually at an intermediate frequency in the region of, say, 1,400 megaHertz are derived from oscillators 6 and are applied to the modulator circuits 4 by way of frequency modulators 7 and band-pass filters 8. The auxiliary or supervisory signal sources represented schematically as sources 9, are connected to apply respective auxiliary or supervisory signals to the modulators 7 either individually so that one low frequency signal is frequency modulated on each local oscillator signal, or differentially so that any one low frequency signal is transmitted as a differential or intercarrier frequency modulation of two of the carrier signals. Such intercarrier modulation is commonly used for example in television broadcasting where the sound channel signals are transmitted as intercarrier modulation between the main carrier and a subcarrier. The outputs from the phase modulators 4 are applied by way of respective band-pass filters 10 to the input of a combining amplifier 11, the output of this amplifier being applied to an output stage (not shown) for transmission over the radio link.

Figure 3:
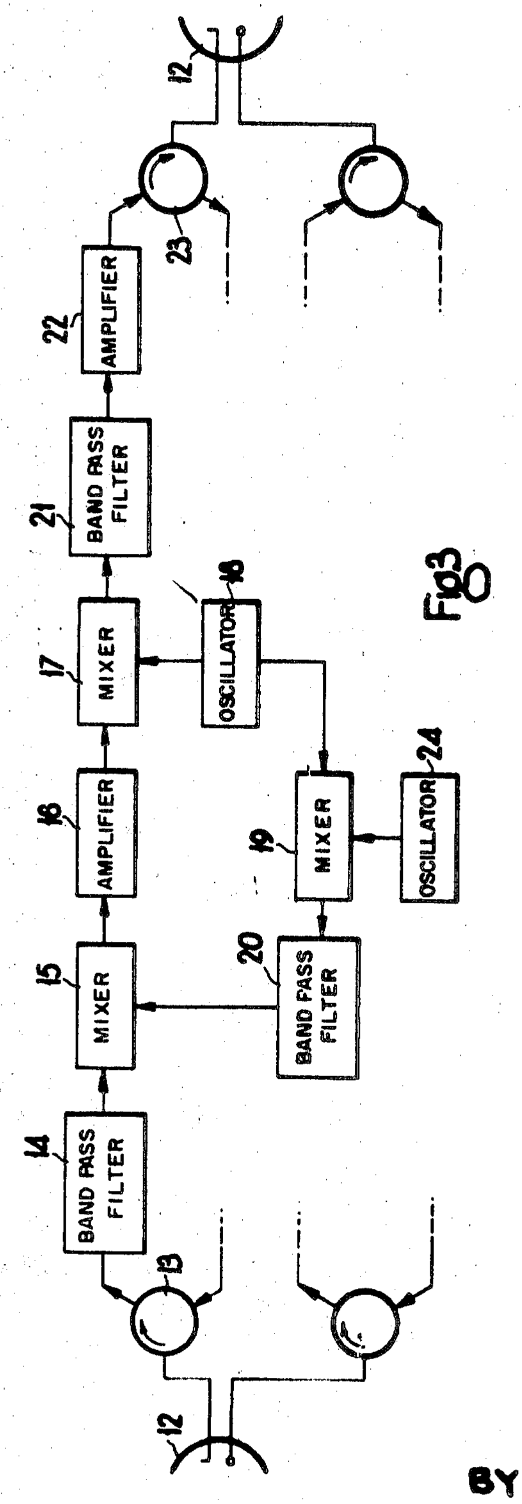
FIG. 3 shows schematically repeater station apparatus for the system of FIG. 1.

Referring now to FIG. 3, the apparatus for a repeater station comprises two aerials 12 each of which is utilized both for transmitting and receiving. Carrier signals at four spaced frequencies are received by one of the aerials 12 and are passed by way of a circulator 13 and a wide band filter 14 to a mixer 15, where the signals are down-changed in frequency to a band centered on say, 1,400 megaHertz, for amplification by an intermediate frequency amplifier 16. Local oscillation signals for the mixer 15 and an upchanging mixer 17 are derived from an oscillator 18, the local oscillation signal for the mixer 17 being applied directly and the local oscillation signal for the mixer 15 being applied by way of a mixer 19 and a band-pass filter 20.

The carrier frequencies which are retransmitted, by way of a filter 21, an amplifier 22, a further circulator 23 and the aerial 12, are arranged to differ in frequency from the respective received carrier frequencies by use of differing local oscillation frequencies for the mixers 15 and 17, a shift frequency signal being applied to the mixer 19 from an oscillator 24. If an auxiliary signal is to be transmitted to the receiving terminal station 2 the output of the oscillator 24 may be frequency modulated by that signal so that the auxiliary signal is modulated on all four carriers.

As shown in FIG. 3, each aerial 12 is arranged to transmit and receive both vertically and horizontally polarized signals, so that each repeater station 3 can transmit and receive two groups of four carrier frequencies in either direction, although for clarity only the apparatus required for one group of four carrier frequencies in one direction is shown.

Figure 4:
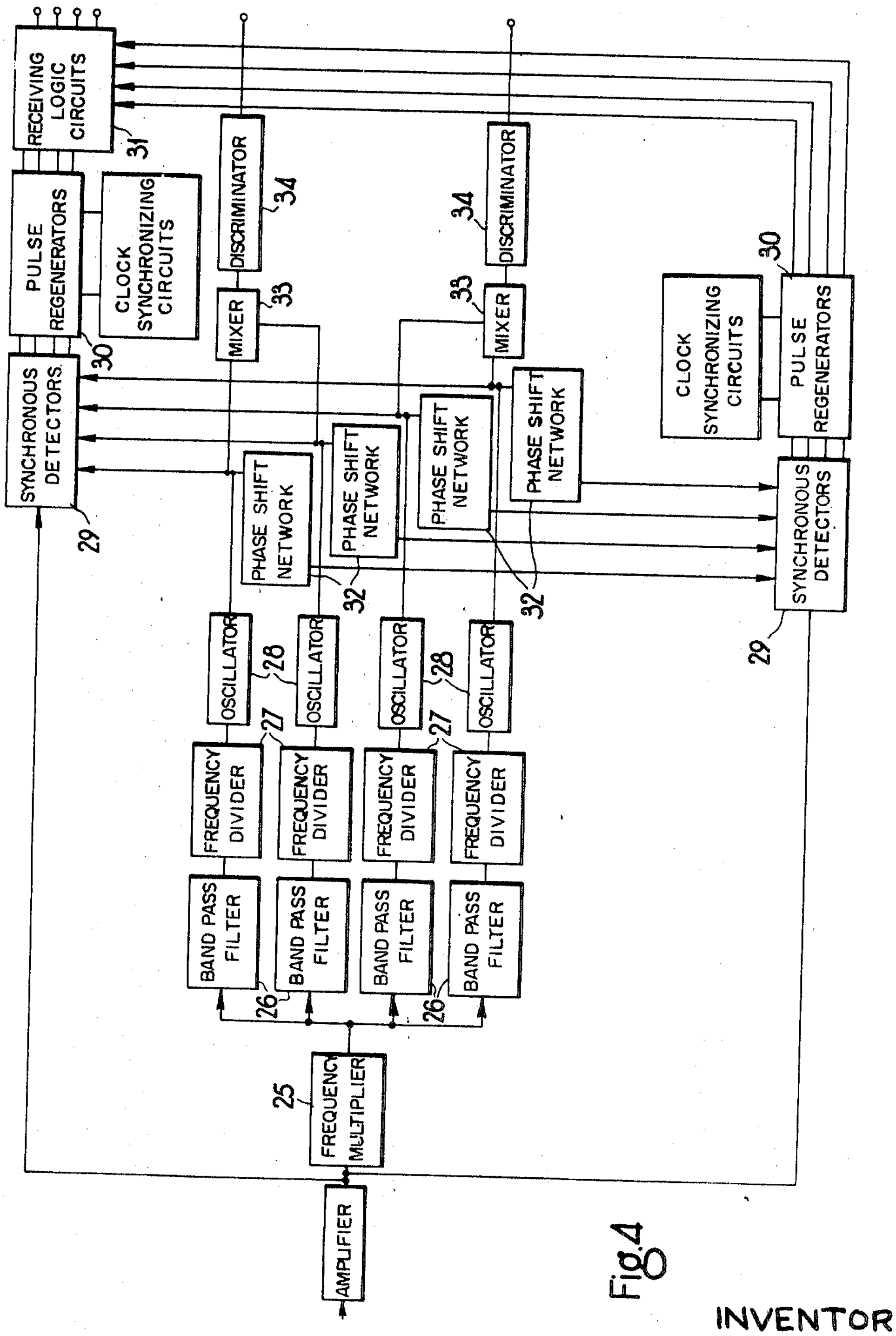
FIG. 4 shows schematically receiving station apparatus for the system of FIG. 1.

Referring now to FIG. 4, the auxiliary signals are received from the carrier signals at the receiving terminal station 2 by frequency multiplying each of the carrier signals by four in a frequency multiplier 25, whereupon the step phase shifts representing the pulse coded data all become multiples of a whole cycle and virtually have no effect on the phase of the frequency multiplied signal. The resulting signals are applied by way of respective filters 26 to frequency dividing stages 27, whereby the original carrier signal frequencies are recovered, still carrying the frequency modulation signals but without the phase shift modulation, and are applied to control the oscillation frequency of respective locked oscillators 28. The data signals are recovered by conventional synchronous demodulation by detectors 28, these signals then being passed by way of pulse regenerators 30 to logic circuits 31 from which individual data pulse trains may be obtained. The phases of the respective carrier signals applied to the two detectors 29 are arranged to differ by 90° by means of respective phase shift networks 32.

Relatively low frequency signals carrying the frequency modulation may be derived by mixing the frequency modulated carrier signals with unmodulated carrier signals or, in the case of differentially modulated carrier signals referred to above, by mixing the differentially modulated carrier signals in respective mixers 33 the outputs of which are applied to respective frequency discriminators 34.

Alternatively all four carrier signals may be applied to respective frequency discriminators (not shown), and appropriate combination of outputs of two discriminators operating on adjacent channels enables separation of the common and the differential frequency modulation signals.

Auxiliary or supervisory signals addressed to a repeater station 3 from one of the terminal stations 1 or 2 may be recovered at the repeater station 3 in the same manner as at a receiving terminal station, that is, by frequency multiplication and then division by four, followed by demodulation.

I claim:

1. A data transmission system in which pulse coded data is transmitted from transmitting apparatus to receiving apparatus, I. the transmitting apparatus comprising A. a source of pulse coded data signals, B. at least one carrier signal source, C. means to phase shift modulate a carrier signal from said carrier signal source with data signals from said source of data signals, D. means to generate an auxiliary signal of much lower frequency than said carrier signal, E. means to frequency modulate said carrier signal with said auxiliary signal using a maximum frequency deviation much lower than the frequency of the carrier signal, such that the maximum phase shift of the carrier signal arising from said frequency modulation during any one pulse interval of said data is much less than the minimum step phase shift utilized in transmitting said data, and II. said receiving apparatus comprising A. means to frequency multiply said carrier signal such that all the step phase shifts utilized in transmitting said data become substantially integral multiples of a complete cycle of the frequency multiplied carrier signal, B. means to frequency divide said frequency multiplied carrier signal to recover the frequency modulated carrier signal, and C. frequency discriminator means responsive to the output of said last mentioned means to detect said auxiliary signal.

2. A data transmission system in accordance with claim 1 wherein the transmitting apparatus includes means to provide two carrier signals of different frequency, and said auxiliary signal is differentially frequency modulated as an intercarrier modulation on said two carrier signals.

3. Transmission apparatus for a data transmission system comprising

A. a source of pulse coded data signals,

B. at least one carrier signal source,

C. means to phase shift modulate a carrier signal from said carrier signal source with data signals from said source of data signals, D. means to generate an auxiliary signal of much lower frequency than said carrier signal, and E. means to frequency modulate said carrier signal with said auxiliary signal using a maximum frequency deviation much lower than the frequency of the carrier signal, such that the maximum phase shift of the carrier signal arising from said frequency modulation during any one pulse interval of said data is much less than the minimum step phase shift utilized in transmitting said data.

4. Receiving apparatus for a data transmission system in which system pulse coded data is transmitted as phase shift modulation of a carrier signal and an auxiliary signal is frequency modulated on said carrier such that the maximum phase shift of the carrier signal due to said frequency modulation during any one pulse interval of said data is much less than the minimum step phase shift utilized in transmitting such data, the receiving apparatus comprising A. means to frequency multiply said carrier signal such that all the step phase shifts utilized in transmitting said data become substantially integral multiples of a complete cycle of the frequency multiplied carrier signal, B. means to frequency divide said frequency multiplied carrier signal to recover the frequency modulated carrier signal, and C. frequency discriminator means responsive to the output of said last mentioned means to detect said auxiliary signal.

PO-1050
(5/69)

UNITED STATES PATENT OFFICE
CERTIFICATE OF CORRECTION

Patent No. 3,603,882 Dated September 7, 1971

Inventor(s) BERNARD WILSON

It is certified that error appears in the above-identified patent and that said Letters Patent are hereby corrected as shown below:

Page 1, change the name of the assignee from

"General Electric and English Electric Companies Limited"

to

-- The General Electric Company Limited -- .

Signed and sealed this 7th day of March 1972.

(SEAL)
Attest:

EDWARD M.FLETCHER,JR.
Attesting Officer

ROBERT GOTTSCHALK
Commissioner of Patents